(No Model.)

K. H. ELLIOTT.
VEHICLE HUB.

No. 306,327. Patented Oct. 7, 1884.

Witnesses:
Jas. A. Harvey
A. R. Dow

Inventor:
King H. Elliott
per
Charles E. Allen
Atty

UNITED STATES PATENT OFFICE.

KING H. ELLIOTT, OF BURLINGTON, VERMONT.

VEHICLE-HUB.

SPECIFICATION forming part of Letters Patent No. 306,327, dated October 7, 1884.

Application filed February 7, 1884. (No model.)

*To all whom it may concern:*

Be it known that I, KING H. ELLIOTT, a citizen of the United States, residing at Burlington, in the county of Chittenden and State of Vermont, have invented certain new and useful Improvements in Vehicle-Hubs, of which the following is a specification, reference being had therein to the accompanying drawings.

My invention relates to improvements in wheel-hubs for vehicles, and the objects of my improvements are, first, to provide a hub so constructed as to form the axle-box, and having a circumferential groove which is designed to retain and firmly hold the spokes, so that there is no possibility of their being affected by grease from the axle-box; second, the protection of its inner extremity by means of a sand-collar so made that it shall effectually prevent the entrance of sand, dirt, or water, or the escape of the lubricating material; and, third, the securing it to the axle-arm by means of a nut-collar so arranged and applied that it cannot soil anything with which it may come in contact by reason of the presence of oil or grease coming from the axle-box. These objects I attain by the simple and durable mechanism illustrated in the accompanying drawings, in which—

Figure 1:
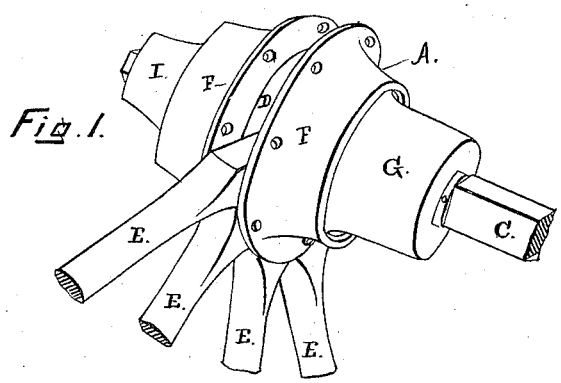
Figure 2:
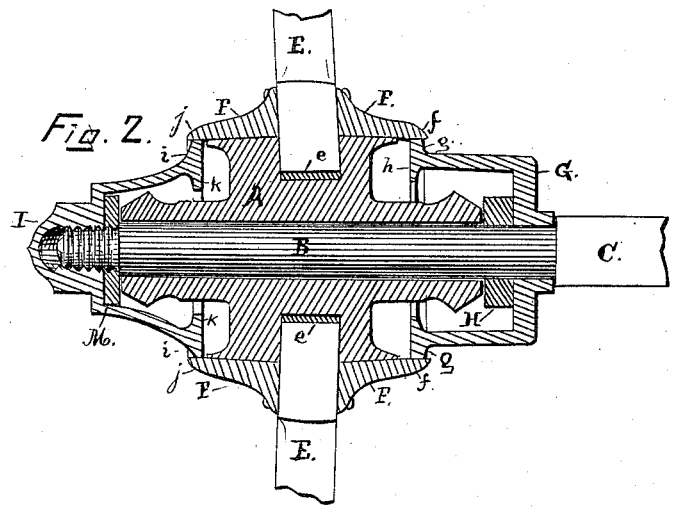

Figure 1 is a perspective view showing the arrangement and combination of the several parts of the wheel-hub. Fig. 2 is a central longitudinal section of the same.

Similar letters indicate like parts throughout the several views.

A is a metallic wheel-hub, through the center of which passes the arm B of the axle C.

D is a circumferential groove in the periphery of the hub A, extending partially through the hub, and into which the lower ends of the several spokes E are tightly fitted, being held firmly in place by the circumferential shoulders F F, between which the spokes E form a circular series, held rigidly by being clamped by and bolted to them. The exterior portion of these shoulders may, if preferred, be made separate from the hub, as shown in Fig. 2, being firmly attached to it by a slot and key, or otherwise, so that they shall revolve with the hub proper.

To break the jar or force of any sudden blow upon the fellies, I insert a thickness of felt, rubber, or other elastic material, e, between the bottom of the groove D and the ends of the spokes E. This may be applied in the form of a band encircling the groove D, or be attached to the lower ends of the spokes E, as preferred.

G is a sand-collar made to fit tightly around the interior end of the axle-arm B, to which it may be secured by a bolt or screw, and provided with a rawhide washer, H, on the inside for the protection of the end of the vehicle-hub. This collar is designed to surround the inner end of the hub A, over which it extends sufficiently far to allow its outer or flanged edge, g, to fit closely beneath the projecting edge f of the inside shoulder or band, F, thereby effectually preventing any sand, dirt, or water from entering between it and the hub, and thence reaching the axle-arm B, as, there being no opportunity for so doing, it falls upon the exterior of the hub and collar, and thence is dropped or thrown off to the ground. A corresponding rim or flange, h, projects downward on the inner edge of the collar G, directly beneath the exterior flange, g, and forms a receptacle on the interior of the collar to catch and retain the deposit of any oil or grease which may exude from the axle-box during its use. When the hub is removed for the purpose of reoiling this receptacle can be readily cleaned and the deposit removed.

On the outer end of the hub A is the nut-collar I, corresponding in construction with the collar G, as far as practicable, and intended to receive the screw on the outer extremity of the arm B, and thus take the place of the ordinary axle-nut. As will be seen in Fig. 2, this collar is made to project over the outer end of the hub A, which it surrounds, so that when screwed into place as far as the washer M on its interior will allow, its exterior flanged edge, i, extends beneath the projection j of the outside shoulder or band, F, sufficiently far to prevent anything which may fall on the exterior of the hub from entering the axle-box, while the rim K, similar to h on the sand-collar G, retains any deposit from the axle-box, and thus the nut-collar is never in a condition to soil the clothing. The hub A thus protected by these end collars constructed and combined with it, as described, is always free from the serious as well as inconvenient effects of sand, oil, or dirt. It is therefore not exposed to anything which interferes with its proper use, nor is it liable to soil that with which it may come in contact.

The entire device is composed of three parts in combination—the metallic hub proper, A, and the sand and nut collars G and I at either end of the hub, respectively.

The circumferential exterior shoulders, F, I prefer to be cast with and form an integral part of the hub A. They may, however, be made separate from and secured to the hub in the manner described.

As the axle-box is thoroughly protected, it is apparent that the device is one which possesses great durability as well as neatness and simplicity in its practical use.

What I claim is—

1. A vehicle-hub having projecting metallic bands F, in combination with the sand-collar G and nut-collar I, substantially as and for the purpose described.

2. The nut-collar I, adapted to receive the end screw of the arm B, and made to surround the outer end of the wheel-hub, and to extend its flanged and rimmed edges beneath the projecting edge of an outer shoulder or band, F, substantially as described.

3. The combination, with the axle C and arm B, of the wheel-hub A, having the peripheric groove D and shoulders F, and sand-collar G, and nut-collar I, substantially as shown and described.

In testimony whereof I do affix my signature in presence of two witnesses.

KING H. ELLIOTT.

Witnesses:
J. C. MEASURE,
CHARLES E. ALLEN.